United States Patent [19]
Haskell

[11] 3,776,635
[45] Dec. 4, 1973

[54] GAS TEMPERATURE MEASUREMENT USING AN ORGANIC COMPOUND HAVING STRONGLY TEMPERATURE-DEPENDENT LIGHT ABSORPTION PROPERTIES

[75] Inventor: Weston W. Haskell, Edwardsville, Ill.

[73] Assignee: Shell Oil Company, Houston, Tex.

[22] Filed: June 5, 1972

[21] Appl. No.: 259,898

[52] U.S. Cl............. 356/43, 250/83.3 UV, 356/36, 356/45, 356/51, 356/201
[51] Int. Cl............................ G01j 5/48, G01n 1/00
[58] Field of Search.................. 356/51, 36, 43, 45, 356/201; 250/83.3 UV

[56] References Cited
UNITED STATES PATENTS
3,519,352   7/1970   Engborg................................ 356/43

Primary Examiner—David Schonberg
Assistant Examiner—V. P. McGraw
Attorney—John M. Duncan et al.

[57] ABSTRACT

A method for continuously measuring rapidly changing temperatures between about 300° to 1,600° K of a gas having a relatively low light absorption at an ultraviolet wavelength, $\lambda$, by including in said gas a quantity of an organic compound which vaporizes without polymerizing, decomposing or reacting with said gas and which has strongly temperature-dependent light absorption properties at said wavelength, $\lambda$; measuring the light absorption of the gas including said organic compound at wavelength $\lambda$; and determining the gas temperature from a previously determined ultraviolet light absorption-temperature relation for the organic compound.

7 Claims, 6 Drawing Figures

SECTION A-A

GAS TEMPERATURE MEASUREMENT USING AN ORGANIC COMPOUND HAVING STRONGLY TEMPERATURE-DEPENDENT LIGHT ABSORPTION PROPERTIES

BACKGROUND OF THE INVENTION

1. Field of the Invention

This invention relates to the measurement of elevated gas temperatures particularly in environments where the gas is not accessible to conventional temperature measurement means, and more particularly in environments where the gas temperature varies rapidly over wide temperature ranges.

2. Prior Art

Existing gas temperature measuring devices suffer from several defects, especially when applied to gas temperatures in the range of 300°–1,600° K. This is particularly true when the gas temperature is fluctuating rapidly. For example, the temperature variations of a gaseous fuel in the cylinder of a gasoline combustion engine are too rapid during compression to be sensed by probe-type measuring devices. Furthermore, optical emissions techniques are frequently not applicable to such gases because the emission intensity is too low for meaningful measurement when temperatures are changing rapidly within a short period of time, say 1 millisecond. Accurate temperature measurement during compression of the vaporized charge gas to a gasoline engine is highly desirable in evaluating the critical reactions leading to engine knock. High temperature gas measurement is also highly desirable in other gaseous systems where interfering ultraviolet absorbing compounds are not present.

Almost all electronic transitions of polyatomic molecules give rise to spectra in the visible and ultraviolet (UV) regions, which extend from a wavelength of 1 micrometer ($\mu$M; $10^{-4}$ cm) to 300 Angstroms (A), or from a frequency from $3 \times 10^{+14}$ to $10^{+16}$ cycles per second. The equation relating the amount of absorption to the nature of the absorbing species is known as the Beer-Lambert equation or as Beer's Law., i.e., $$\log_e I_0/I = \sigma dc$$

where $I_0$ and $I$ are the intensity of the incident and transmitted monochromatic light, $d$ is the light path length (in centimeters), $c$ is the concentration, molecules per cc of the absorbing species and $\sigma$ is the absorption cross section, centimeter square per molecule. This equation is often written as $\log_e I_0/I = A$, where $A$ is absorbance for a given $d$ and $\sigma$, and is directly proportional to the concentration of the absorbing species.

The position of spectral lines and the separation between them can be measured in terms of frequency, wavelength or wave number. Wave number $\bar{\nu}$ is defined by $\bar{\nu} = 1/\lambda = \nu/c$, where $\lambda$ is the wavelength and $c$ is the velocity of light. Wave number is frequently a more useful quantity than wavelength since it is directly proportional to frequency and can, therefore, be taken as a measure of energy. Frequency, $\nu$, is generally expressed in cycles per second or Hertz (Hz); wavelength, $\lambda$, is generally expressed in micrometers ($\mu$m), nanometers (nm) or Angstroms (A); wave number, $\lambda$, is expressed as the number of waves per centimeter (cm$^{-1}$). For additional background information see R. Chang, *Basic Principles of Spectroscopy*, McGraw-Hill Book Company, N.Y., 1971.

Ultraviolet absorption spectra are caused by electron transitions from one orbital of a molecule to another. As for diatomic molecules, "allowed" and "forbidden" electronic transitions are distinguished for polyatomic molecules (Ibid, p. 128). An electronic transition is considered "allowed" if it can occur as an electric dipole transition, according to a set of known selection rules, without taking account of the interaction of vibration or rotation with the electronic motion. In other words, an electronic transition is considered as "allowed" if it can occur for fixed nuclei. Electronic transitions that are not in harmony with the given selection rules are in general weak and are considered as "forbidden." However, some of these forbidden transitions may have appreciable intensities. Allowed electronic transitions give rise to the most intense absorption spectra of polyatomic molecules. But the forbidden electronic transitions do occur weakly and are much more important for polyatomic than for diatomic molecules.

Certain organic compounds are known to have temperature-dependent absorption bands at certain spectroscopic wavelengths. For example, benzene has a faint absorption band at the long wavelength side of the 2,600 A bands which increases in intensity with temperature. See G. Hertzberg, "Molecular Spectra of Molecular Structure III. Electronic Spectra and Electronic Structure of Polyatomic Molecules," D. Van Nostrand Co., Inc., Princeton, N. J. (1966), page 178. Benzene is said to offer one of the best examples known for the vibrational structure of a forbidden transition. See H. Sponer and E. Teller, Reviews of Modern Physics, 13 75, 115 (1941). This occurs in the near ultraviolet absorption system at 2,700–2,200 A. Heretofore UV absorption measurements for benzene have been made at relatively low temperatures, i.e., below about 300° K, and the UV absorption of benzene in the longer wavelengths than about 2,700 A has been considered too low to measure. Thus, the temperature-dependence of benzene absorption measurements at these wavelengths has not been recognized.

Absorption measurements in the UV region are generally made with a UV spectrophotometer having the following basic features:

1. A source of radiation in the UV region (2,000–3,500 A) which is usually a hydrogen discharge lamp.
2. A monochromator which is usually a prism or a grating.
3. A detector, which is usually phototube or photomultiplier.
4. A recorder.

Suitable UV spectrophotometers are commercially available for measuring gas temperatures according to the method of this invention.

The method of this invention can be used to good advantage to study the effect of combustion engine compression temperatures on the octane requirement of gasoline. In the early 1950's, the Coordinating Research Council (CRC) contracted projects to develop methods of measuring gas temperatures up to the time of an engine knock caused by the combustion characteristics of the fuel. Three techniques resulted. First, the null infrared technique was developed at the University of Wisconsin. (See M. C. Burrows, et al, "The Measurement of Unburned Gas Temperatures in an Engine by Infrared Radiation Pyrometer," SAE Trans.

69, 1961). This technique measures the fourth power of temperature and is accurate only above 550° K (530° F). Second, Agnew at Purdue developed the two-wavelength radiation emission technique with the same qualities as the null technique. (See W. G. Agnew, "End Gas Temperature Measurement by a Two-Wavelength Infrared Radiation Method," SAE Trans. 69, 1961). Both techniques have been used to study peak compression temperatures. Research at Massachusettes Institute of Technology[1] and the Ethyl Corporation[2] lead to the velocity of sound technique which is less sensitive to temperature but could be used for temperature measurements in a cylinder when the piston is near bottom dead center (BDC) of its stroke.

[1] J. C. Livengood, et al. "Measurement of Gas Temperatures in an Engine by the Velocity of Sound Method," SAE Trans. 66, 1958, p. 683.
[2] M. E. Gluckstein, et al., "End-Gas Temperature-Pressure Histories and Their Relation to Knock," SAE Trans., 1961, p. 529.

SUMMARY OF THE INVENTION

This method of measuring rapidly changing elevated temperatures in the range of 300° to 1,600°K includes the following steps: selecting an organic compound which vaporizes without polymerizing, decomposing or reacting with said gas and which has strongly temperature-dependent light absorption properties at the wavelength $\lambda$; determining the relation between the UV light absorption and the temperature of said organic compound at wavelength $\lambda$; including a quantity of the organic compound in said gas; measuring the light absorption of the gas including the organic compound at wavelength $\lambda$; and determining the gas temperature from the relation between ultraviolet light absorption and temperature previously determined for the organic compound.

The relation between UV absorption and the temperature of the gas may be determined by the following equations:

a. $\sigma = \sigma_o T^n$, and
b. $I/I_o = e^{-\sigma dc}$, where $\sigma$ is the absorption cross section at a given absolute temperature $T$; $\sigma_o$ is absorption cross section per temperature to power $n$; $n$ is a constant which is experimentally determined for said organic compound; $I$ is the intensity of a transmitted monochromatic radiation along path length $d$ at wavelength $\lambda$; $I_o$ is the intensity of the transmitted radiation in the absence of the organic compound at the same wavelength; $e$ is the Naperian base constant, 2.71828; $d$ is the path length of the transmitted light through the gas being measured; and $c$ is the concentration of the temperature-dependent organic compound.

Figure 1:
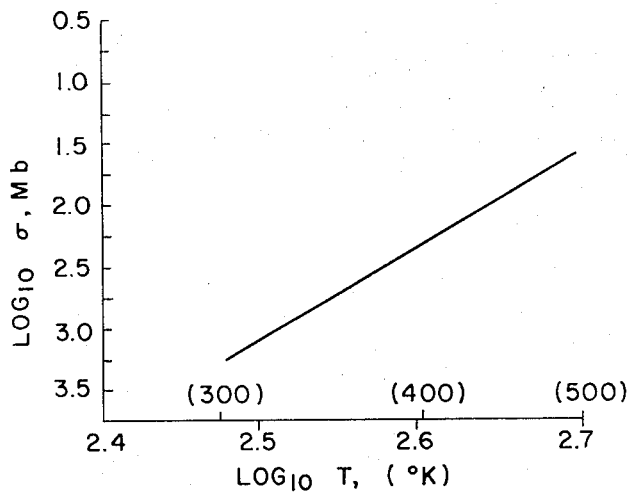
FIG. 1 is a plot of $-\log_{10}\sigma$, Mb, versus $\log_{10} T$, °K, at a wavelength of 275.4 nm, over a temperature range of 300°–500° K, and illustrates the relation between temperature and UV absorption for benzene at this wavelength.

These figures are discussed in greater detail in the examples.

DETAILED DESCRIPTION

The method of the invention is applicable to gases having rapidly fluctuating temperature and a relatively low light absorption at a preselected ultraviolet wavelength, $\lambda$. The method is especially applicable to temperatures which are changing in the range of $10^3$ °K/second to $10^9$ °K/second. Such rapidly changing temperatures can be measured without an appreciable lag in response time.

Suitable gases include, but are not limited to, hydrocarbons in the gasoline boiling range, nitrogen, inert gases, air and air hydrocarbon mixtures. The temperature of gases having a high UV light absorption, e.g., chlorine, cannot be measured by this method.

The first step in determining the temperature of a gas is to select a suitable organic compound which has strongly temperature-dependent light absorption properties at the preselected ultraviolet wavelength, $\lambda$. Selection of the organic compound will depend upon the type of gas whose temperature is to be measured as well as upon the temperature-dependent UV light absorption properties of the organic compound. It is important that the organic compound not react with the gas being measured, that it not polymerize or oxidize, and that it not decompose at the temperatures being measured, i.e., its UV light absorption properties must not change appreciably. Examples of suitable temperature-dependent organic compounds include, but are not limited to, methylacetylene, benzene, allylene, allene and certain conjugated diolefins such as hexadiene-1,3 and hexadiene-2,4. Certain fluorinated organic compounds, such as freon are also considered suitable. Hexafluorobenzene is not satisfactory, however, because it does not possess the necessary temperature-dependent ultraviolet absorbing properties.

After the organic compound has been selected the relation between ultraviolet light absorption and temperature is determined at wavelength $\lambda$ for a given concentration of the organic compound. This can be accomplished with commercially available spectrophotometric equipment. A measured quantity of organic compound is introduced into a suitable heated optical cell and the UV light absorption of the organic compound is determined at several different measured temperatures. The UV absorption-temperature relation is expressed by the equations a. $\sigma = \sigma_o T^n$,
b. $I/I_o = e^{-\sigma dc}$ where $\sigma$ is the absorption cross section at absolute temperature $T$; $\sigma_o$ is the cross section per temperature to power $n$; $n$ is a constant which is experimentally determined for organic compound; $I$ is the intensity of a transmitted monochromatic light signal along path length $d$ at wavelength $\pi$; $I_o$ is the intensity of the transmitted radiation in the absence of the organic compound; $e$ is the Naperian base constant, 2.71828; $d$ is the path length of the transmitted light through the gas being measured; and $c$ is the concentration of the temperature-dependent organic compound. Consistent dimensions must be used, and the preferred metric dimensions are:

$\sigma = \sigma_o$ are in megabarns (Mb), $10^{-18}$ centimeter squared

T in °Kelvin $\lambda$ is in nanometers $d$ is in centimeters $c$ is in molecules per cubic centimeter.

Once the UV light absorption-temperature relation has been determined for the temperature-dependent organic compound, measurement of the temperature of a gas having a relatively low light absorption at wavelength $\lambda$ is made by including a quantity of the temperature-dependent organic compound in the gas and determining its UV light absorption. The temperature of the gas is then determined from the UV light absorption of the included organic compound.

To determine gas temperature at a single wavelength it is necessary that the concentration of the included organic compound be known. Concentrations of the organic compound depend on path length and temperature. For benzene at a path length of about 6 cm, concentrations of from 0.05 to 10 percent are suitable. Suitable concentrations for other organic compounds can be readily determined by experimentation.

Temperatures can also be determined where the concentration of the included temperature dependent organic compound is unknown. In this method absorption measurements are made at two ultraviolet wavelengths, one where the UV light absorption for the organic compound is temperature-dependent and another where the UV light absorption is temperature-independent. The ratio of the absorbances are then related to temperature by the equation $$A_\lambda / A_{\lambda}' = KT^n,$$

where $A_\lambda$ is the absorbance measured at wavelength $\lambda$ at which absorbance cross section, $\sigma$, is temperature dependent; $A_\lambda'$ is the absorbance measured at a wavelength $\lambda$ at which absorption cross section, $\sigma$, is temperature-independent; $K$ is an experimentally determined constant which is the ratio of $\sigma$ at wavelength $\lambda$ to $\sigma'$ at wavelength $\lambda'$; $T$ is absolute temperature; and $n$ is a constant which is experimentally determined for said organic compound.

Benzene can be used effectively as the included organic compound to measure gas temperatures where its concentration is unknown. For example, if $\lambda$ is measured at about 2,754 A and $\lambda'$ is measured at about 2,400 A, then $K$ is about $3.35 \times 10^{-20}/T^n$ for temperatures between about 300° and 500° K.

Temperatures in the range from about 300° K to about 1,600° K can be measured by the method of the invention. The actual temperature limits of the method depend to some extent upon the pressure and path length being used. For example, with benzene at 274 nm measurements at 300° K are practical at one atmosphere with 20 centimeters path length.

The relation between UV light absorption and temperature is independent of pressure for the method of the invention.

The ultraviolet absorption measurements discussed were made with a Jarrell-Ash dual-grating monochromator. The accuracy of the temperature measurements was checked by employing a heated gas ultraviolet optical absorption cell and measuring the UV absorption cross section at known temperatures. The cell was fitted with sapphire windows and had a path length of 19.7 centimeters. Iron-constantan thermocouples were used to measure gas temperatures in the cell to correlate UV light absorption with temperature. The thermocouple readout system was checked against a calibrated mercury thermometer. The temperatures agreed within 1° F over the range of cell temperatures employed. These correlations confirmed the accuracy of the method of this invention in relatively stable systems which were not capable of accurately measuring temperatures that vary rapidly.

The following examples are included to illustrate the invention.

EXAMPLE I

This example illustrates the effect of temperature on the ultraviolet absorption properties of benzene between about 300°–500° K.

Benzene concentration within a gas UV optical absorption cell was controlled by adding liquid benzene to a flowing nitrogen stream. The liquid flow rate was adjusted with a needle valve while the liquid was atomized or vaporized within an ⅛" copper tubing immersed in a Wood's metal bath at 150° F. The nitrogen-benzene vapor mixture was then passed continuously through the absorption cell.

A temperature dependent benzene absorption band occurs between 260 to 240 nanometers (nm) but the absorption cross section in this region is too high to be useful at higher gas temperatures and the change in cross section with temperature is small. Accordingly, a wavelength of 275.4 nm, which has a low absorption cross section at room temperature, was selected for this example.

The results of several benzene-nitrogen tests made at atmospheric pressure are listed in Table 1.

TABLE 1

| $C_6H_6$, %v | $\sigma$, Mb$^a$ | $Log_{10}\sigma$,Mb | T, °K | $Log_{10}T$ °K |
|---|---|---|---|---|
| 34.4 | 0.0006 | −3.22 | 303 | 2.48 |
| 33.1 | 0.0014 | −2.84 | 344 | 2.54 |
| 32.8 | 0.0017 | −2.76 | 351 | 2.55 |
| 32.4 | 0.0039 | −2.41 | 386 | 2.58 |
| 32.4 | 0.0043 | −2.37 | 389 | 2.59 |
| 32.2 | 0.0116 | −1.94 | 454 | 2.66 |
| 20.5 | 0.0109 | −1.96 | 454 | 2.66 |

$^a$Megabarn/$10^{-18}$cm$^2$.

The logarithm of absorption cross section, $Log_{10}\sigma$, in megabarns is plotted versus logarithm of temperature, $Log_{10}$ °K, in FIG. 1. The data points lie on a straight line. Hence, the results are accurately described by an equation of the form $\sigma = \sigma_o T^n$. From the data of FIG. 1 and Table 1, it can be determined that, $$n = 6.95 \pm 0.2, \text{ and}$$

$$\sigma_o = 3.7 \times 10^{-21} \text{ Mb}/T^n.$$

EXAMPLE II

Benzene UV absorption data taken at temperatures in the range of 300°–1,600° K at a wavelength of 275.4 nm show that the value of $n = 6.95 \pm 0.2$ determined in Example I is not valid over this broader temperature range.

Figure 2:
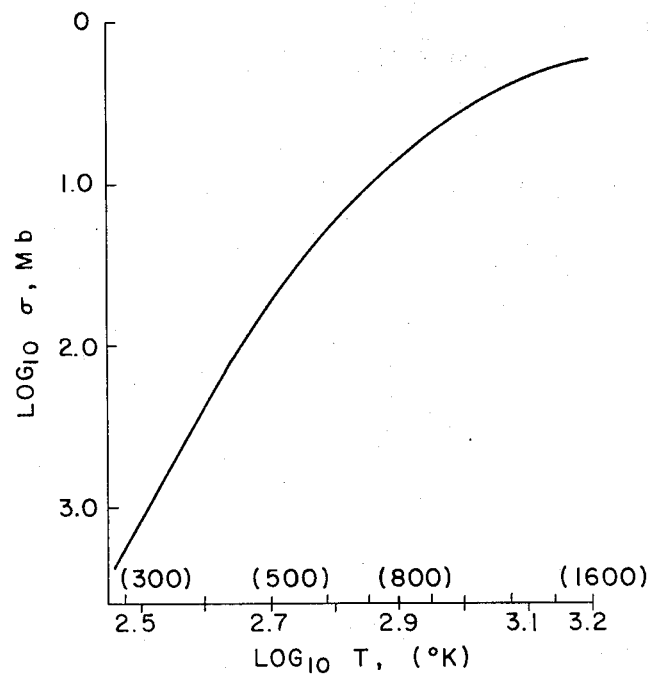
FIG. 2 is a plot of $-\log_{10}\sigma$, Mb, versus $\log_{10} T$, °K, at a wavelength of 275.4 nm, over a temperature range of 300–1,600° K, and illustrates the relation between temperature and UV absorption for benzene over a broader temperature range.

Several more benzene-nitrogen tests were made at higher temperatures in a shock tube. The UV absorption and temperature data are listed in Table 2 and show graphically in FIG. 2.

TABLE 2

$C_6H_6$,

| Mol./cc × 10 | Ae[b] | $\sigma$, Mb[a] | T, °K |
|---|---|---|---|
| 1.5 | 0.071 | 0.30 | 1060 |
| 1.55 | 0.092 | 0.39 | 1240 |
| 1.35 | 0.030 | 0.15 | 860 |
| 1.50 | 0.117 | 0.26 | 1040 |
| 1.55 | 0.182 | 0.39 | 1190 |
| 0.85 | 0.124 | 0.48 | 1460 |
| 1.58 | 0.214 | 0.36 | 1210 |
| 1.64 | 0.290 | 0.46 | 1380 |
| 1.54 | 0.177 | 0.30 | 1110 |
| 1.54 | 0.170 | 0.29 | 1110 |
| 1.38 | 0.069 | 0.13 | 840 |

[a]Megabarn = $10^{-18} cm^2$.
[b]Ae = $1n\ I_o/I = \log_e I_o/I$.

Because the data range over nearly three orders of magnitude, the differences between the experimental data and the computed function appeared to be small. A function which fits the data was determined to be of the form, $$\sigma = 6.1 \times 10^{-4}\ Z^n/1 + B\ Z^k\text{, megabarns}$$

where $Z = T/300$  $T =$ Temperature, °K

The parameters $n$, $k$, and $B$ were adjusted to fit the low temperature data of Example I. The result was:

$$n = 8$$
$$B = 0.05$$

$k = 5.5$. This function fits the data within experimental error to 1,600° K. Above 1,600° K the calculated absorption cross section was somewhat greater than the observed values. A higher power term in the denominator would correct this misfit if temperature above 1,600° K are encountered.

EXAMPLE III

This examples illustrates the effect of temperature on the ultraviolet absorption properties of methylacetylene between about 300° to 600° K.

Methylacetylene was taken directly from a high pressure cylinder. Analysis by gas-liquid chromatography showed that it contained 2.4 percent acetylene and, at most, 0.4 percent allene, which also exhibits UV temperature dependence. If the 0.4 percent impurity were all allene, the UV absorption by allene would account for only 1/5 of the observed absorption at the wavelength used.

An ultraviolet wavelength of 240 nanometers was selected to measure the UV light absorption of methylacetylene in the cell. The results of several methylacetylene-nitrogen absorption tests at various temperatures, all made at atmospheric pressure, are listed in Table 3.

TABLE 3

| Methylacetylene, Mol. × $10^{-8}$/cc | A[b] | $Log_{10}\sigma$ Mb[a] | T, °K |
|---|---|---|---|
| 2.38 | 0.02 | −4.310 | 306.5 |
| 2.38 | 0.032 | −4.163 | 306.5 |
| 2.38 | 0.027 | −4.232 | 306.5 |
| 1.98 | 0.060 | −3.812 | 368.6 |
| 1.61 | 0.156 | −3.308 | 452.5 |
| 2.37 | 0.033 | −4.150 | 308.6 |
| 1.98 | 0.058 | −3.826 | 369.1 |
| 2.01 | 0.048 | −3.82 | 363.5 |
| 1.60 | 0.162 | −3.28 | 465.3 |

[a]Megabarn = $10^{-18} cm^2$.
[b]A = $1n\ I_o/I = \log_e I_o/I$.

Figure 3:
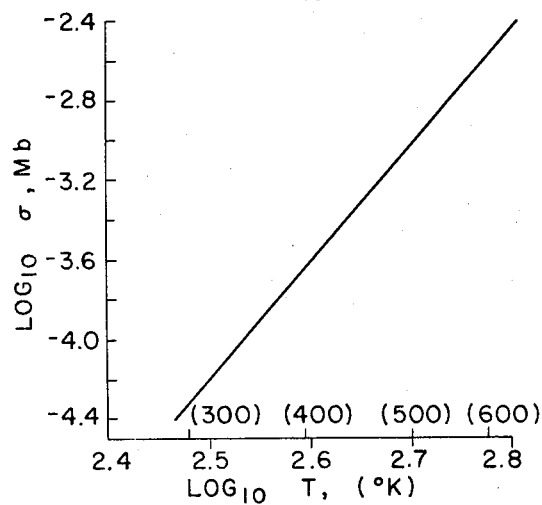
FIG. 3 is a plot of $-\log_{10}\sigma$, Mb, versus $\log_{10} T$, °K, for methylacetylene at a wavelength of 240 nm over a temperature range of about 300–600° K, and illustrates the temperature dependence of another suitable organic compound that may be added to the gas whose temperature is to be measured.

A plot of the logarithm of absorption cross section $Log_{10}\sigma$, Mb, versus the logarithm of temperature, $Log_{10}$ T, °K, is shown in FIG. 3.

The relationship between $\sigma$ and temperature is accurately described by the equation $$\sigma = \sigma_o T^n,$$

where $\sigma_o = 6.36 \times 10^{-19}/T^n$, and $n = 5.6 \pm 0.5$.

The absorption cross section for methylacetylene is independent of pressure. The observed value of $\sigma$ was constant over a range of pressures from 250 psi to 450 psi. From temperatures up to nearly 1,000° K the absorption cross section of a given concentration of methylacetylene at 240 nanometers is a function of temperature alone. Thus $\sigma$ serves as a gas thermometer limited only by photomultiplier response times.

EXAMPLE VI

This example illustrates how the high temperature gas measurement method of the invention can be used to study the relationship between combustion chamber surface temperatures and engine octane requirements.

A recent Society of Automotive Engineers (SAE) paper* (* J. P. Bradish, P. S. Myers and O. A. Vyehara, SAE Paper 660130, Jan., 1966.) contained a model simulating the effect of deposit thickness and physical properties on combustion chamber deposit surface temperatures. That model predicted large increases in the compression temperature because of heat transfer from the hot deposit surface to the gaseous hydrocarbon mixture during the intake stroke. Although theoretical predictions are made, no temperature data are given. The rapid response and high sensitivity of the temperature measurement method of the instant invention permits a direct measure of the effect of combustion chamber deposits on gaseous hydrocarbon temperatures.

Figure 4A:
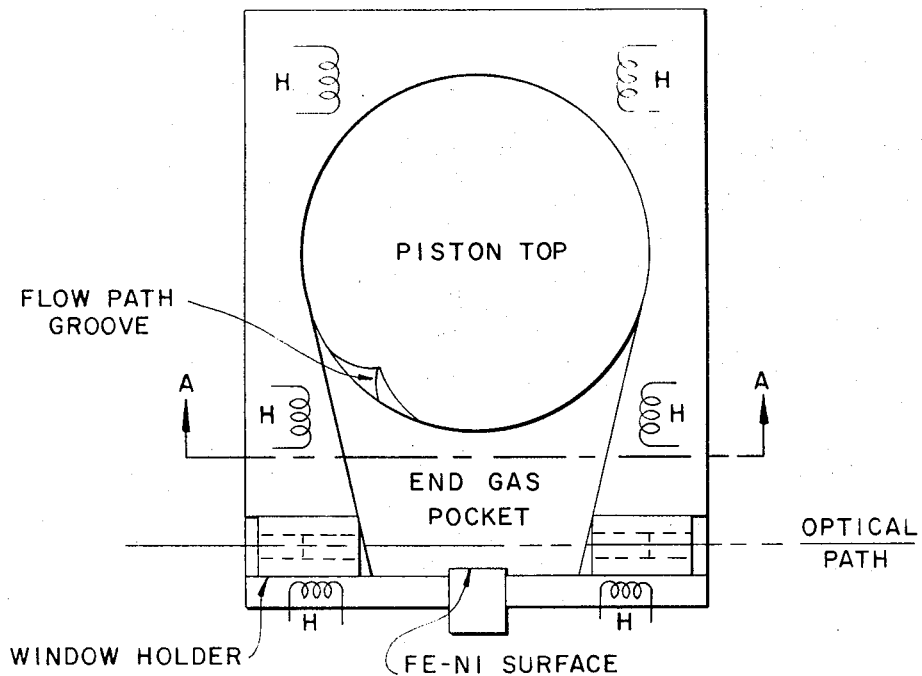
FIG. 4A is a schematic top view of a combustion chamber, with head removed, which has been modified to accommodate ultraviolet light absorption tests.
Figure 4B:
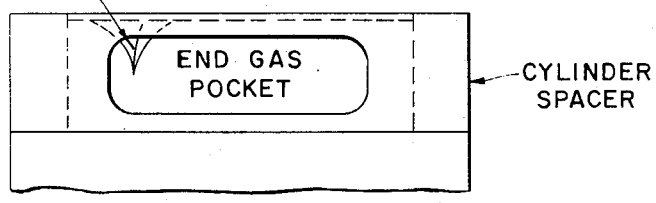
FIG. 4B is a section view of the combustion chamber.

The temperature data for this example were obtained on a modified Cooperative Fuel Research, (CFR) engine used in combustion research. The engine, which is schematically illustrated in FIG. 4, has an end gas pocket with an optical path which is normally used for studying chemical reactions leading to knock. With respect to temperature gradients along the optical path, the method of the invention weights the data to a temperature to the seventh power. That is, cold gas boundary layers at the cell window surfaces have little influence on light transmission measurements. Photomultiplier output voltages are digitized and stored as numerical values in a computer. Those numerical values are then averaged for several cycles and stored for various crank angle positions for later conversion to temperature by computer. The output of the photomultiplier could also be fed to an oscilloscope for manual data reduction.

Monochromatic light is passed through the combustion chamber along the optical path to a photomultiplier cell.

All data were obtained at 12:1 compression ratio, an intake mixture temperature of 100° F (311° K) and 2 to 4%v benzene in air. The engine was motored at 450, 675, and 900 rpm with variable head temperatures. In order to vary the head temperature, all coolant passages in the engine were filled with solid lead and heated electrically. Thus the head temperature could be varied independently, UV absorption measurements were obtained and maintained at 350° K (170° F) and 385° K (233° F), for each engine speed. Table 4 shows the temperature measurements and operating conditions for six tests.

TABLE 4
ENGINE OPERATING CONDITIONS AND MEASURED BENZENE TEMPERATURES

| Run No. | 7 | 8 | 9 | 11 | 12 | 13 |
|---|---|---|---|---|---|---|
| Speed RPM | 675 | 450 | 900 | 675 | 450 | 900 |
| Benzene %v | 3.76 | 3.45 | 3.45 | 2.20 | 2.09 | 2.84 |
| Temperatures °K | | | | | | |
| Coolant | 384 | 352 | 353 | 384 | 385 | 387 |
| Inlet | 311 | 311 | 311 | 313 | 314 | 314 |
| 75 CA-BTDC[a] | 418 | 425 | 421 | 450 | 452 | 450 |
| 5 CA-BTDC[a] | 601 | 611 | 621 | 679 | 670 | 668 |
| Peak Press, psia | 276 | 261 | 284 | 281 | 279 | 288 |

[a]CA-BTDC — Crank Angles Before Top Dead Center

Figure 5:
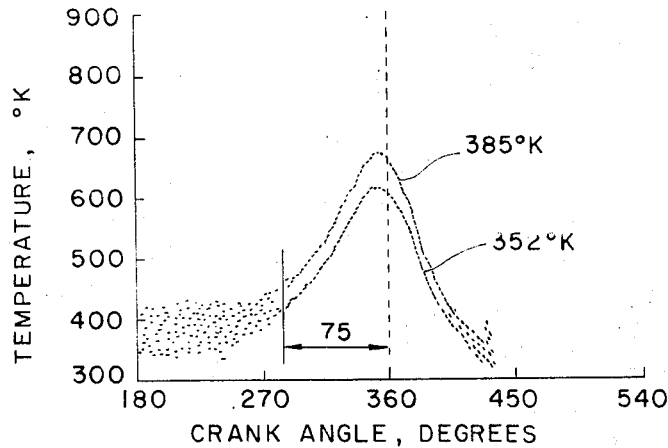
FIG. 5 is a plot of gas temperature during compression versus engine crank angle in degrees at two different head temperatures, as determined from benzene absorption measurements in a combustion chamber.

The measured compression temperatures at 450 rpm and at two coolant temperatures (352° K and 385° K) from the benzene UV absorption data of Table 4 are shown in FIG. 5. Similar results were obtained at 675 and 900 rpm. The scatter in the data up to 285° crank angle (CA) (75° before top dead center BTDC) results because benzene, at a concentration of 3%v does not significantly absorb light below a temperature of about 400° K.

The smooth data beyond 285° crank angles result from a digital filtering or averaging process. Each dot represents an average of three data points at each CA while accumulating for 150 compression cycles (an average of 450 data per dot).

The top set of data in FIG. 5 is for the higher heat temperature (nominally 35° K higher). The temperature differences are significant throughout compression and expansion, being approximately 60° K at the peak compression temperature.

What is claimed is:

1. A method for measuring rapidly changing temperatures between about 300° and 1,600° K of a gas having a relatively low light absorption at an ultraviolet wavelength, $\lambda$, which comprises:

selecting an organic compound which vaporizes without polymerizing, decomposing or reacting with said gas at the temperatures being measured and which has strongly temperature-dependent light absorption properties at said ultraviolet wavelength, $\lambda$;

determining the relation between ultraviolet light absorption and temperature for said organic compound at wavelength, $\lambda$;

including a quantity of the organic compound in said gas;

measuring the light absorption of the gas including the organic compound at wavelength $\lambda$; and determining the gas temperature from the relation between ultraviolet light absorption and temperature previously determined for the organic compound.

2. The method of claim 1 wherein the relation between ultraviolet light absorption and temperature is determined by the equations:

a. $\sigma = \sigma_o T^n$, and b. $I/I_o = e^{-\sigma\, dc}$, where $\sigma$ is absorption cross section at a given absolute temperature T; $\sigma_o$ is the absorption cross section per temperature to power $n$; $n$ is a constant which is experimentally determined for said organic compound; $I$ is the intensity of transmitted monochromatic radiation along path length $d$ at wavelength $\lambda$; $I_o$ is the intensity of the transmitted radiation, in the absence of the organic compound at the same wavelength; $e$ is the Naperian base constant, 2.71828; $d$ is the path length of the transmitted light through the gas being measured; and $c$ is the concentration of the temperature-dependent organic compound.

3. The method of claim 1 wherein the relation between ultraviolet light absorption and temperature is determined by the equation $$A\lambda/A\lambda' = KT^n,$$

where $A_\lambda$ is the absorbance measured at wavelength $\lambda$ at which absorbance cross section, $\sigma$, is temperature dependent; $A_{\lambda'}$ is the absorbance measured at a wavelength $\lambda$ at which absorption cross section, $\sigma$, is temperature independent; $K$ is an experimentally determined constant which is the ratio of $\sigma$ at wavelength $\lambda$ to $\sigma'$ at wavelength, $\lambda'$; $T$ is absolute temperature; and $n$ is a constant which is experimentally determined for said organic compound.

4. The method of claim 3 wherein the organic compound is benzene; $\lambda$ is about 2,754 A; $\lambda'$ is about 2,400 A; and $K$ is about $3.35 \times 10^{-20}/T^n$ for temperatures between about 300° and 500° K.

5. The method of claim 2 wherein the gas temperature, $T$, is between about 300° and 700° K; the organic compound included in the gas is methylacetylene; the wavelength, $\lambda$, is about 240 nanometers; $\sigma_o$ is about $6.36 \times 10^{-19}$ megabarns/$T^n$, and $n$ is $5.6 \pm 0.5$.

6. The method of claim 2 wherein the gas temperature, $T$, is between about 300° and 500° K; the organic compound included in the gas is benzene; the wavelength, $\lambda$, is about 275.4 nanometers; $\sigma_o$ is about $3.7 \times 10^{-27}$ megabarns/$T^n$; and $n$ is $6.95 \pm 0.2$.

7. The method of claim 1 wherein the organic compound included in the gas is benzene; $\lambda$ is about 275.4 nanometers, the relation between ultraviolet light absorption and temperature is determined by the equation:

$$\sigma = 6.1 \times 10^{-4} Z^n/1 + BZ^k,$$

where $Z$ is $T/300$; $T$ is the absolute temperature, °K; $n$ is about 8, $B$ is about 0.05, and $K$ is about 5.5.

* * * * *